No. 872,674. PATENTED DEC. 3, 1907.
F. J. NOLAN.
SAFETY GUARD FOR TROLLEY WHEELS.
APPLICATION FILED NOV. 26, 1906.
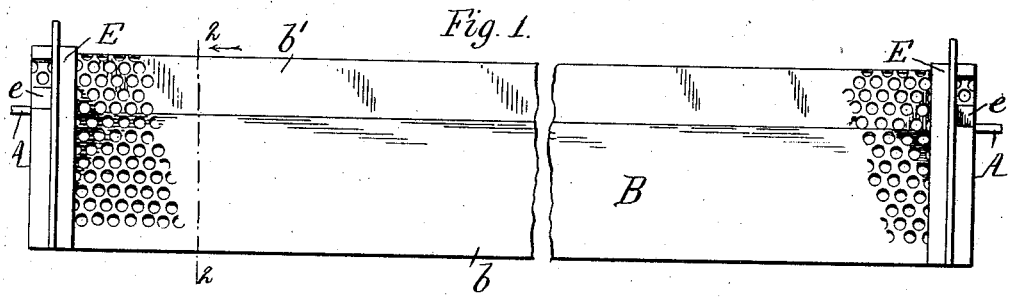
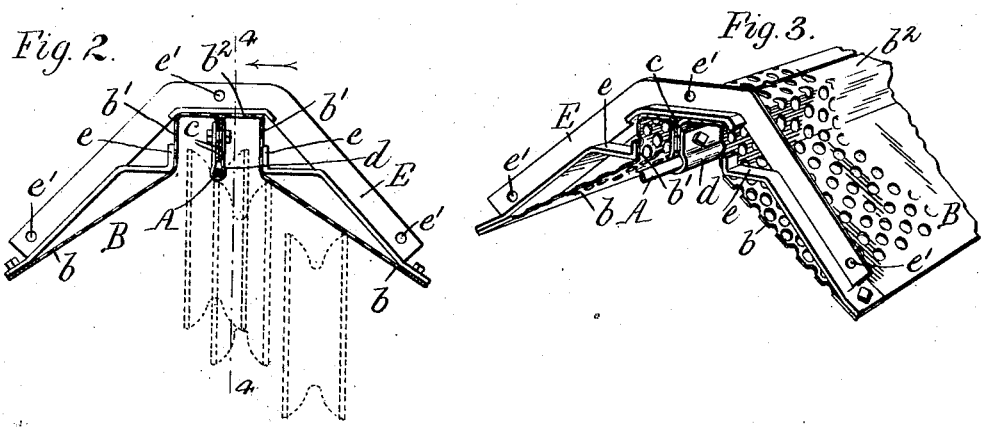
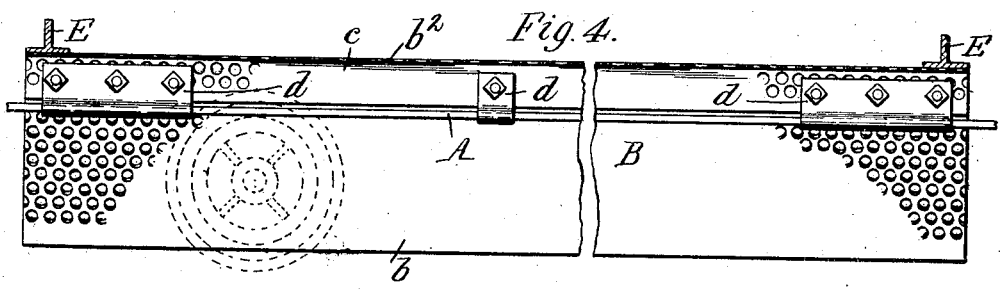
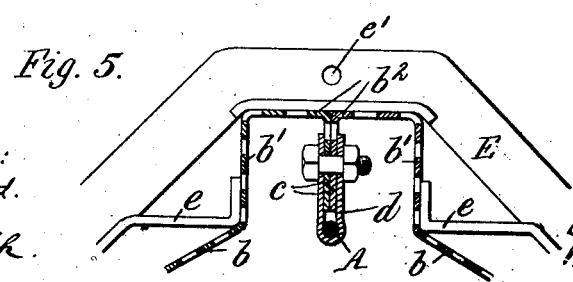

UNITED STATES PATENT OFFICE.

FRANK J. NOLAN, OF BUFFALO, NEW YORK, ASSIGNOR TO AUTOMATIC TROLLEY GUARD COMPANY, OF BUFFALO, NEW YORK.

SAFETY-GUARD FOR TROLLEY-WHEELS.

No. 872,674.  Specification of Letters Patent.  Patented Dec. 3, 1907.

Application filed November 26, 1906. Serial No. 345,116.

*To all whom it may concern:*

Be it known that I, FRANK J. NOLAN, a citizen of the United States, residing at Buffalo, in the county of Erie and State of New York, have invented a new and useful Improvement in Safety-Guards for Trolley-Wheels, of which the following is a specification.

This invention relates to improvements in safety guards for use on overhead-trolley electric railways for catching the trolley and supplying current thereto in case it leaves the wire. These guards are placed along the trolley wire at railway crossings, curves, in car houses and other places where the trolley is liable to leave the wire or where it would be dangerous for the cars to be stalled. They are made of conducting material and in electrical connection with the trolley wire, so that in the event of the trolley leaving the wire it will encounter and travel along the guard and receive therefrom sufficient current to keep the car in motion.

The primary object of this invention is to provide a trolley guard which will not only serve to catch the trolley wheel in case it leaves the wire and furnish current to the same, but will also cause the trolley wheel to return automatically to its proper position upon the trolley wire.

A further object of the invention is to construct a guard that will be light, rigid and durable, can be economically manufactured and will not be bent out of shape by the action of heat from the exhausts of passing locomotives, the force of the wind, the weight of snow and ice, or any other similar cause.

In the accompanying drawings: Figure 1 is a side elevation of a trolley guard embodying the invention. Fig. 2 is a transverse sectional elevation thereof in line 2—2, Fig. 1, showing trolley wheels in different positions thereon in broken lines. Fig. 3 is a perspective view of one end thereof. Fig. 4 is a lengthwise sectional elevation of the same in line 4—4, Fig. 2, the trolley wheel being shown by broken lines. Fig. 5 is a fragmentary enlarged transverse sectional elevation of the guard.

Like letters of reference refer to like parts in the several figures.

A represents the trolley wire, and B the body of the trolley guard, which is arranged lengthwise of the wire and straddling or extending to opposite sides of the wire. The guard body has sides or wings $b$ which slope or converge upwardly toward the trolley, terminating at about the horizontal plane thereof so as to leave an intervening longitudinal space, pocket or channel in which the wire is located midway between the guard wings. In the construction shown, the wings $b$ are connected by a pocket or channel portion having vertical side walls $b'$ rising from the upper edges of the wings and joined by a top $b^2$ above the wire. Preferably the guard body is formed of two like halves of sheet metal which meet at the center of the top of the pocket portion of the guard and have flanges which extend downwardly in the pocket and are bolted or otherwise secured together and form a longitudinal rib for supporting the trolley wire. Any suitable means can be employed for attaching the trolley wire to this supporting rib, such, for instance, as the loops $d$ surrounding the wire at suitable intervals with their ends embracing and bolted or otherwise secured to the supporting rib $c$. If a conductor which is not round in cross-section is used, other attaching devices better suited to the particular form of the conductor can be employed and they can be secured in any other suitable way to the supporting rib. The supporting means for the trolley wire are such that the wire is positioned in substantially the horizontal plane of the bottom of the pocket portion of the guard. This pocket portion is of somewhat greater depth than the flanges of the trolley wheel and is somewhat wider than the wheel, the portion thereof on each side of the trolley wire being, however, of less width than the trolley wheel. This allows the trolley wheel to travel freely upon the wire without coming into contact with any portion of the guard, but prevents the wheel, when it has left the wire, from entering the pocket, or space between the sides or wings $b$ of the guard and the wire.

E E represent strengthening and supporting yokes for the guard arranged at each end thereof and at any point intermediate thereof where the strain is such as to require additional support. They are preferably formed of T-iron or other flanged bars and have a flat top or central portion corresponding to the top of the pocket portion of the guard, and inclined legs extending from the upper corners of this pocket portion to the outer lower edges of the guard wings where they are bolted or otherwise secured to the same. Portions of the inclined legs of the yoke extend inwardly to form braces *e e* for the lower outer corners of the pocket portion of the guard on the outer sides thereof. These braces considerably stiffen and strengthen the sides of the pocket and prevent the same from being bent out of position by contact with the trolley wheel or its pole in case the wheel leaves the wire before it reaches the guard. Suitable holes *e'* are provided in the center and at the ends of the yokes E for the attachment of the usual insulated supporting and stay wires (not shown) for suspending the trolley guard in position over the trolley wire.

The body of the guard can be made of solid sheets of metal if desired. It has been found preferable, however, to employ perforated sheet metal, as shown in the drawing, thus greatly decreasing the weight of the guard without materially lessening its strength and rigidity.

It is not necessary for carrying out this invention, that the inclined sides or wings *b* of the guard be connected by the pocket portion. The wings may simply be separated by an intervening space within which the trolley wire is located. Inasmuch as the trolley wheel has no access to this pocket or space, the action of the device will be equally efficient with this portion removed, provided suitable means are provided for strengthening the wings of the guard and sustaining the trolley wire centrally in the required position in this opening. The construction shown, however, is preferred as it can be economically built and renders the guard strong and rigid and provides a simple and satisfactory support for the trolley wire.

When in use, the guard is in electrical connection with the trolley wire. When the trolley wheel slips from the wire it encounters and runs along one of the inclined sides or wings of the guard receiving the electric current therefrom so that the motion of the car is continued. As the wheel travels along the inclined side or wing of the guard, the upward pressure of the trolley pole will cause the trolley wheel to gradually move up the incline of the wing to the upper edge thereof, where it encounters the trolley wire and slips back into position thereon.

The perforations in the body of the guard are of small size and the sides of the guard therefore present a comparatively smooth surface to the trolley wheel when it travels along the same and maintain a constant contact therewith so that the electrical connection between the trolley wheel and the guard is continuous. This prevents any breaks or interruptions in the electric current such as frequently occur when guards with larger meshes are used.

The trolley wire, in the preferred construction of the guard, is located substantially in the plane of and parallel with the upper edges of the inclined wings or sides of the guard, so that the dislodged trolley wheel will contact with the wire before leaving the wing and will therefore pass from the inclined wing back onto the trolley wire with little jar and without breaking the current and sparking. I do not wish, however, to be confined to this particular construction as it is obvious that the guard would be operative if the pocket were made deeper and the trolley wire supported in a higher position therein.

I claim as my invention:

1. The combination with a trolley wheel and a trolley wire, of a guard having upwardly converging side portions which are separated from the wire on each side thereof by a space of less width than the width of the trolley wheel, whereby the trolley wheel, when displaced, is guided to the wire, substantially as set forth.

2. The combination with a trolley wheel, of a guard therefor having upwardly converging side portions separated by an intervening space, and a trolley wire supported in said space between the upper edges of said side portions and separated therefrom on each side by a space of less width than the width of the trolley wheel, whereby the trolley wheel, when displaced, is guided to the wire, substantially as set forth.

3. The combination with a trolley wheel, of a guard therefor having upwardly converging side portions and a central pocket portion, and a trolley wire supported in said pocket portion and separated on each side thereof from said side portions by a space of less width than the width of the trolley wheel, substantially as set forth.

4. The combination with a trolley wheel, of a guard therefor having upwardly converging side portions and a central pocket portion, and a trolley wire supported in said pocket portion in substantially the same horizontal plane with the upper edges of said side portions and separated therefrom on each side by a space of less width than the width of the trolley wheel, substantially as set forth.

5. A guard for trolley wheels having upwardly converging side portions, a central pocket portion connecting said side portions, and supporting means for the trolley wire in said pocket portion, substantially as set forth.

6. A guard for trolley wheels having upwardly converging side portions, a central pocket portion connecting said side portions, and a supporting rib for the trolley wire in said pocket portion, substantially as set forth.

7. A guard for trolley wheels having upwardly converging side portions, a central pocket portion connecting said side portions, a supporting rib for the trolley wire in said pocket portion, and yokes secured to said side and pocket portions for strengthening the guard, substantially as set forth.

8. A guard for trolley wheels having upwardly converging side portions, and a central pocket portion connecting said side portions, said guard being composed of two halves having flanges which depend centrally in said pocket portion and are secured together to connect said halves of the guard and form a supporting rib for the trolley wire, substantially as set forth.

Witness my hand, this 21st day of November, 1906.

FRANK J. NOLAN

Witnesses:
C. B. HORNBECK,
C. W. PARKER.